Figure 1:
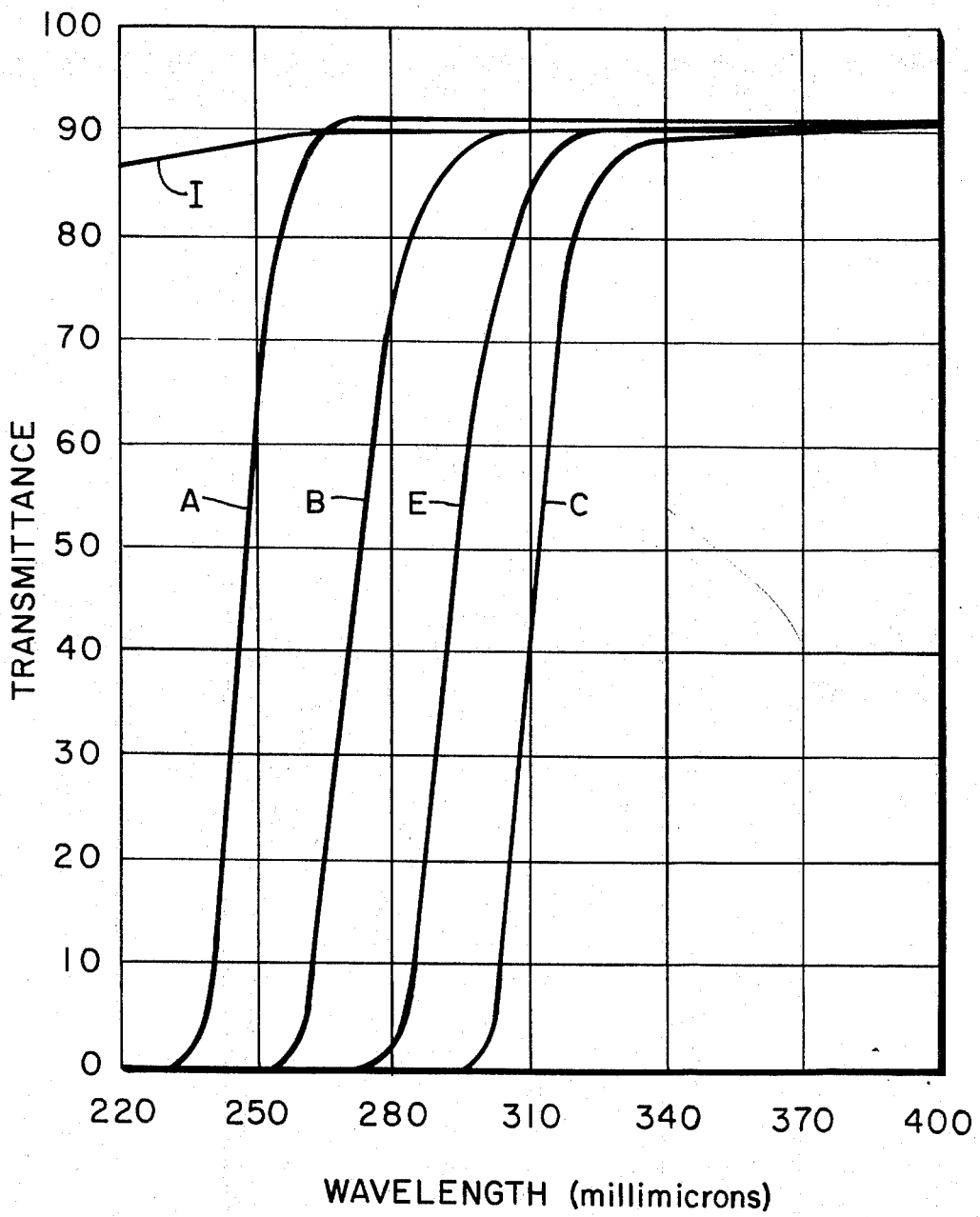

United States Patent [19]
Schultz

[11] 3,785,722
[45] Jan. 15, 1974

[54] USE OF $SiO_2$-$Nb_2O_5$ AND/OR $Ta_2O_5$ GLASSES AS ULTRAVIOLET FILTERS

[75] Inventor: Peter C. Schultz, Painted Post, N.Y.

[73] Assignee: Corning Glass Works, Corning, N.Y.

[22] Filed: June 20, 1972

[21] Appl. No.: 264,426

Related U.S. Application Data

[63] Continuation-in-part of Ser. No. 72,326, Sept. 15, 1970, abandoned.

[52] U.S. Cl............ 350/320, 65/21, 65/66, 106/52, 252/300, 350/1
[51] Int. Cl....... G02b 13/14, C03c 3/24, G02b 5/22
[58] Field of Search........... 106/52, 47 Q; 252/300; 350/320

[56] References Cited
UNITED STATES PATENTS

| | | | |
|---|---|---|---|
| 3,031,318 | 4/1962 | Janakirama-Rao | 106/52 |
| 2,326,059 | 8/1943 | Nordberg | 106/52 |
| 3,717,441 | 2/1973 | Rapp | 106/52 |
| 3,597,252 | 8/1971 | Schroeder et al. | 106/52 |
| 3,644,607 | 2/1972 | Roques et al. | 106/52 X |
| 3,677,960 | 7/1972 | Ishiyama | 106/52 |
| 3,499,775 | 3/1970 | Albinak et al. | 106/52 |
| 3,711,262 | 1/1973 | Keck et al. | 106/50 |

OTHER PUBLICATIONS

Schroeder, H. "Oxide Layers Deposited from Organic Solutions" Physics of Thin Films, Vol. 5, Academic Press (1969), p. 87, pp. 96–98, pp. 120–122, 136–137

Primary Examiner—Helen M. McCarthy
Attorney—Clarence R. Patty, Jr. et al.

[57] ABSTRACT

Glass filters and their use in controlling transmission of radiation is disclosed. The filters have a sharp transmission cut off within the ultraviolet region of the spectrum and also withstand high temperatures and severe heat shock. They are produced from a fused silica glass having a composition consisting essentially of silica and 1–25 percent $R_2O_5$ wherein the $R_2O_5$ consists of 0–5 percent $Nb_2O_5$ and/or 0–25 percent $Ta_2O_5$. The transmission cut off may be shifted across the ultraviolet transmission range by varying the amount of additive.

1 Claim, 3 Drawing Figures

USE OF SIO₂-NB₂O₅ AND/OR TA₂O₅ GLASSES AS ULTRAVIOLET FILTERS

This application is a continuation-in-part application of Ser. No. 72,326, filed Sept. 15, 1970, now abandoned.

Glass color filters are commonly used to provide precisely controlled optical transmission within the visible spectrum, that is within the range of 400 to 700 millimicrons. These filters are used for such divergent purposes as traffic signals, color grading of materials, and sunglasses. The desired visible transmission effects are usually obtained by adding to a base glass one or more metal oxides from the group commonly known in the glass art as coloring oxides.

That portion of the radiation spectrum immediately adjacent the visible range on the lower wavelength side is commonly known as the ultraviolet range, and is generally considered to extend over the wavelength range of 130 to 400 millimicrons. Interest in controlling, or filtering, radiation within this ultraviolet range has been somewhat sporadic in the past. However, the increasing use of luminescent screens, including the well-known image transmitting screens, metal vapor lamps and photo lamps has significantly changed this situation and created a considerable interest in this area.

One particular problem is the difficulty in generating and transmitting radiation within one wavelength range, while substantially completely absorbing radiation outside this range. For example, both cathode ray tubes and fluorescent lamps operate by generation of radiation outside the visible spectrum, with subsequent secondary generation of radiation within the visible spectrum. Necessarily, care must be taken to avoid transmission of the primary radiation which may be harmful to the eyes of one viewing the radiation source.

This problem of absorbing ultraviolet radiation in ordinary glass tubes or envelopes, composed for example of a soda lime glass, is described in U.S. Pat. No. 2,862,131 granted to J. A. Escher-Desrivieres on Nov. 25, 1958. This patent describes the addition of a small amount of cerium oxide or vanadium oxide to an ordinary soda lime glass for the purpose.

U.S. Pat. No. 3,253,174, granted May 24, 1966 to T. H. Elmer and M. E. Nordberg, points out that the problem of transmission control in the ultraviolet region is further complicated by the need for glasses that are both resistant to heat shock and capable of operating at extremely high temperatures on the order of 1,000°-1,200° C. The Elmer et al. patent describes the incorporation of small amounts of iron, cerium, molybdenum, or vanadium oxides in a 96 percent silica glass by an impregnation procedure.

Both of the above-mentioned patents describe the achievement of transmission cut offs within the range of 300-360 millimicrons. Frequently, it is desirable to achieve a cut off at a still lower wavelength within the ultraviolet region. For example, certain image transmitting devices may be either activated or erased by radiation of a specific wavelength. Consequently, it is vital to have precise transmission control in the vicinity of this wavelength. Also, it is often desirable to achieve an even sharper cut off than is provided by the glasses described in either of the above mentioned patents.

It is then the purpose of the present invention to solve these outstanding problems, to provide an improved method of controlling radiation transmission, particularly within the ultraviolet region of the radiation spectrum, and to provide filters particularly adapted to such use.

To these ends, and others which will become apparent, my invention is an ultraviolet filter composed of a fused silica type glass prepared by flame hydrolysis consisting essentially of silica and 1–25 percent $R_2O_5$ wherein the $R_2O_5$ consists of 0–5 percent $Nb_2O_5$ and/or 0–25 percent $Ta_2O_5$. The filter is substantially non-absorbing in the visible portion, and has a sharp transmission cut off within the ultraviolet region of the radiation spectrum. The invention further comprehends an improved method of controlling transmission of radiation wherein the radiation is passed through a fused silica glass filter the glass composition of which, in percent by weight on an oxide basis, consists essentially of 1–25 percent $R_2O_5$, the $R_2O_5$ consisting of 0–5 percent $Nb_2O_5$ and/or 0–25 percent $Ta_2O_5$, 75–99 percent $SiO_2$, and 0–10 percent $Al_2O_3$ and/or $TiO_2$. It further resides in a method of producing such filter which comprises forming a mixture of hydrolyzable vapors in proportions calculated to provide 99–75 percent $SiO_2$, 1–25 percent $R_2O_5$ consisting of 0–5 percent $Nb_2O_5$ and/or 0–25 percent $Ta_2O_5$ and 0–10 percent $Al_2O_3$ and/or $TiO_2$ on the oxide basis, converting the vapor mixture to oxides by flame hydrolysis, either vitrifying the oxide particles in the flame and depositing them as a glass body or depositing the particles on a support and subsequently forming a glass body by heat treatment, and thereafter forming a filter of desired shape from the glass body.

A suitable glass for present purposes is essentially a fused silica glass prepared by flame hydrolysis and containing niobia ($Nb_2O_5$) and/or tantala ($Ta_2O_5$) as an additive for ultraviolet transmission control. The upper limit on the amount of $R_2O_5$ additive is the amount that can be incorporated in a silica glass before crystallization occurs. Niobia must be limited to 5 percent by weight, and preferably no more than 3 percent, for this reason. Up to 25 percent $Ta_2O_5$ may be added, although, above 20 percent $Ta_2O_5$, some crystals may form causing a haziness in the glass.

Insofar as I am aware, $Nb_2O_5$ and $Ta_2O_5$ are the only oxides that impart to a fused silica glass the unusual transmission cut off that characterizes the present invention. In general, the presence of an appreciable amount of another oxide either causes crystallization to occur or otherwise interferes with the characteristic sharp cut off imparted by $Nb_2O_5$ or $Ta_2O_5$. Thus, $ZrO_2$ and $B_2O_3$ tend to broaden the wavelength range within which the transmission cut off occurs. I have found however that up to 10 percent alumina and/or titania may be present without creating any substantial interference.

The term "fused silica glass" is used throughout the present specification and claims to designate a glass composed primarily of silica ($SiO_2$) and prepared by the flame hydrolysis technique. This technique of glass preparation, and numerous specific embodiments thereof, are described in detail in U.S. Pat. No. 2,326,059, granted Aug. 3, 1943 to M. E. Nordberg; U.S. Pat. No. 2,239,551, granted Apr. 22, 1941 to R. H. Dalton et al.; and a companion application Ser. No. 208,168, filed Dec. 15, 1971 under the title "Method of Producing Glass" and in the names of P. C. Schultz and F. W. Voorhees.

In general, the method comprises supplying, in vapor form, a hydrolyzable compound of silicon, alone or in admixture with a small amount of a similar compound of another glass forming oxide. The vapors are passed into a flame of combustible gas in a burner where they are hydrolyzed and decomposed to form oxides. Depending on the temperature of the flame, the oxides formed (primarily silica) may be deposited directly in the vitreous state, or may be deposited on a mandrel or other form as a dense, finely divided powder (known as a soot) which may subsequently be vitrified by heat treatment. The flame hydrolysis technique, as adapted to the production of pure silica glass, is described in U.S. Pat. No. 2,272,342, granted Feb. 10, 1942 to J. F. Hyde. Modifications thereof, concerned with the introduction of other oxides into the fused silica glass, are described in the other patents and applications mentioned earlier.

In producing the fused silica filters of the invention, a suitably proportioned mixture of vapors of hydrolyzable compounds of silicon and tantalum and/or niobium is entrained in a dry carrier gas such as oxygen. The vapor mixture is passed through a burner to hydrolyze the vapors and convert them to the corresponding oxides by flame hydrolysis. The oxides thus formed are preferably melted in the flame and deposited in vitreous form on a suitable mandrel or bait. In this manner, a substantial deposit of glass is built up in a form commonly known as a boule.

The boule may be removed from the deposition furnace and rapidly cooled to room temperature for inspection purposes if desired. Alternatively, it may be transferred to a furnace at or slightly above the glass annealing temperature and then cooled at a suitable rate to provide an annealed body. Finally, the boule may be cut, or otherwise reworked, to desired shape for filter use and the shaped filters ground and polished to optical quality, if required.

In carrying out this flame hydrolysis method, any hydrolyzable compound of silicon, niobium and/or tantalum may be used. In the event the compounds are compatible in mixture and have suitable vapor pressures, a liquid mixture may be used. Otherwise, the compounds may be vaporized separately and the vapors combined in suitable proportions. If necessary the delivery system will be kept properly heated to avoid condensation.

It is generally preferable to use the metal chlorides as the hydrolyzable compounds. These are the least expensive and most readily available. Also, they are convenient to use and produce by-products that are easier to control. However, from a technical standpoint, any other vaporizable and hydrolyzable compound may be substituted. These include particularly the other halides and organo-metal compounds.

The vapors may be entrained by any carrier gas that does not react with the vapor during entrainment. This includes inert gases such as nitrogen, and combustible gases such as oxygen and natural gas. I prefer to use an oxygas burner for the flame hydrolysis step, and then employ either oxygen or natural gas as the carrier gas. The carrier gas must of course be dry to avoid premature hydrolysis of the vapors and consequent clogging of the delivery system.

The invention is further illustrated and described with reference to specific glasses. The compositions of these glasses, as calculated in percent by weight on the oxide basis, are set forth in the following table:

TABLE

|  | A | B | C | D | E | F | G | H | I |
|---|---|---|---|---|---|---|---|---|---|
| $SiO_2$ | 96.1 | 92.0 | 86.6 | 76.0 | 98.4 | 96.1 | 95.1 | 90.4 | 100 |
| $Ta_2O_5$ | 3.9 | 8.0 | 13.4 | 24.0 |  |  |  | 3.6 |  |
| $Nb_2O_5$ |  |  |  |  | 1.6 | 3.9 | 2.8 |  |  |
| $Al_2O_3$ |  |  |  |  |  |  | 2.1 |  |  |
| $TiO_2$ |  |  |  |  |  |  |  | 6.0 |  |

A glass corresponding to each of the above compositions was produced from a suitable mixture of the corresponding chloride vapors, the proportions of the mixture being calculated on the basis of the oxide composition desired. The respective chloride vapors were entrained in a stream of carrier gas, specifically oxygen, and passed through a high temperature oxygas burner. This produced, by flame hydrolysis, a glass of corresponding oxide composition as shown in the table.

In each case, a glass boule, approximately 6 inches in diameter and one inch in thickness, was built up on a rotating bait in a furnace and subsequently removed from the deposition furnace and cooled. A thin strip of glass was cut from each boule and ground and polished in conventional manner to a thickness of 2 millimeters. This provided a sample of suitable optical quality for measurement of the ultraviolet spectrum of each glass.

Each of the thin samples thus produced was mounted in a spectrophotometer, Model No. 350 marketed by the Perkin-Elmer Corp. of Norwalk, Conn. Transmittance measurements, in percent of total transmittance at each wavelength over the range of 185 to 400 millimicrons, were made on several of the samples and recorded by the instrument. The resulting curves are reproduced in FIG. 1 of the accompanying drawing wherein transmittance values in percent are plotted with respect to the vertical co-ordinate and wavelengths in millimicrons are plotted with respect to the horizontal co-ordinate. The capital letter adjacent each curve indicates that the transmittance curve is characteristic of a glass having a composition corresponding to that letter in the table above.

It is of particular interest to note the sharp cut off in transmittance, that is the steepness of the curve, for a given glass as the transmittance increases from 10 to 80 percent. The graphical representation of FIG. 1 demonstrates that filters produced from glasses according to the present invention generally increase from 10 percent transmittance to 80 percent transmittance over a narrow wavelength band of 15 to 20 millimicrons.

It is also interesting to note that the cut off range moves closer to the edge of the visible spectrum, that is about 400 millimicrons, as the content of additive oxide, in particular tantalum oxide, is increased. In this manner, the cut off point, or range, can be adjusted or selected by proper adjustment or selection of the additive content in the glass.

It is also of interest to note that the characteristic effect of $Nb_2O_5$ and $Ta_2O_5$ on ultraviolet transmission in silica base glasses is not found in other base glasses. This is illustrated in FIG. 2, wherein transmittance in percent is plotted with respect to wavelength as in FIG. 1.

Figure 2:
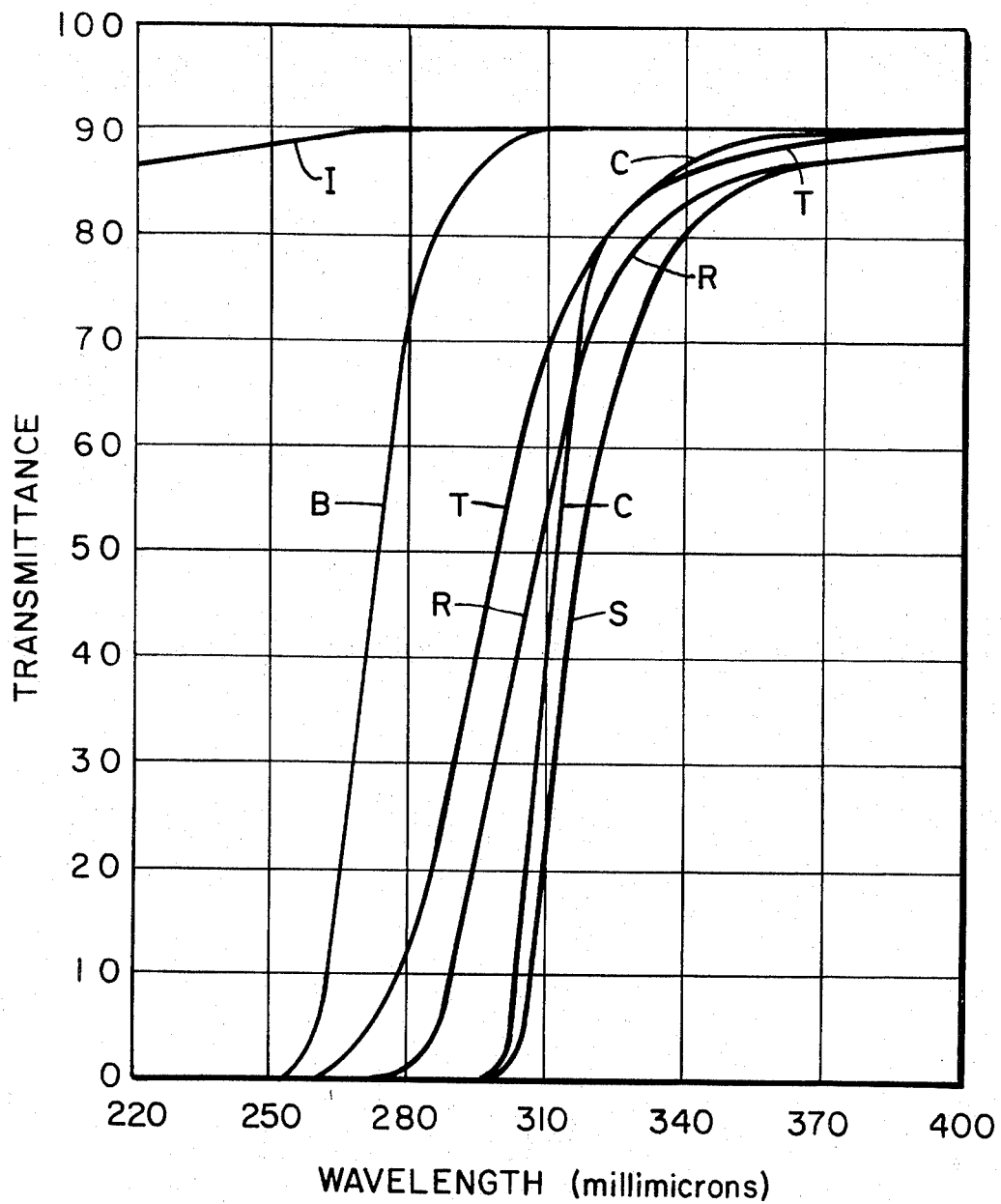

In FIG. 2, curves B and C correspond to the similarly identified curves in FIG. 1. Curve R is the transmission curve for a typical commercial $Na_2O$-$B_2O_3$-$SiO_2$ glass. Curve S is a transmittance curve for a $Na_2O$-$B_2O_3$-$SiO_2$ base glass to which there has been added 15 percent $Nb_2O_5$. Curve T is a similar curve for the same base glass with 15 percent $Ta_2O_5$ added. Finally, curve I represents the transmission curve for a substantially pure fused silica produced by the flame hydrolysis method. This is a glass essentially containing 100 percent silica and no additive.

It will be observed that the addition of a major amount (15 percent by weight) of either $Nb_2O_5$ or $Ta_2O_5$ to a borosilicate base glass provides very little change in the transmission characteristics of such glass. In contrast, the addition of such oxides to a fused silica glass completely alters the transmission characteristics. In particular, the characteristic sharp cut off in the fused silica glasses is not found in the borosilicate glasses. Rather, the present effect is unique to silica type or base glasses.

Quite surprisingly, it has not been found possible to prepare satisfactory filters for the purposes of the invention from $R_2O_5$-$SiO_2$ glasses of corresponding composition that have been melted in accordance with known glass melting procedures. In particular, the melted glasses are not completely transparent in the visible and have a sloping cut off across a wide band in the ultraviolet portion of the radiation spectrum.

The following table records the compositions of several glasses that were melted as part of an effort to produce suitable filters from melted glasses. The compositions are in percent by weight on an oxide basis as calculated from the glass batches:

TABLE

|  | 1 | 2 | 3 | 4 | 5 | 6 |
|---|---|---|---|---|---|---|
| $SiO_2$ | 99 | 96 | 92 | 99.5 | 99.0 | 98.5 |
| $Ta_2O_5$ | 1 | 4 | 8 | — | — | — |
| $Nb_2O_5$ | — | — | — | 0.5 | 1.0 | 1.5 |

Glass batches, composed of oxides and corresponding to each composition, were mixed thoroughly by ball milling for 8 hours. Each batch was placed in a platinum crucible and heated in the temperature range of 1,800°-1,850° C. for 16 hours with a slightly oxidizing atmosphere in a gas fired furnace. The melt was then cooled and the glass removed for preparation of transmission samples.

In each case, the glass was essentially colorless, but was so seedy (full of gas bubbles) that meaningful transmission measurements could not be made. Accordingly, each glass sample was gound to a powder of −100 mesh size. A portion of each powdered glass (20 to 50 grams) was then placed in a shallow platinum container and remelted at 1,800° C. for ten hours. The glass bodies thus produced were less seedy and 2 mm. thick samples were prepared for transmission measurements.

Figure 3:
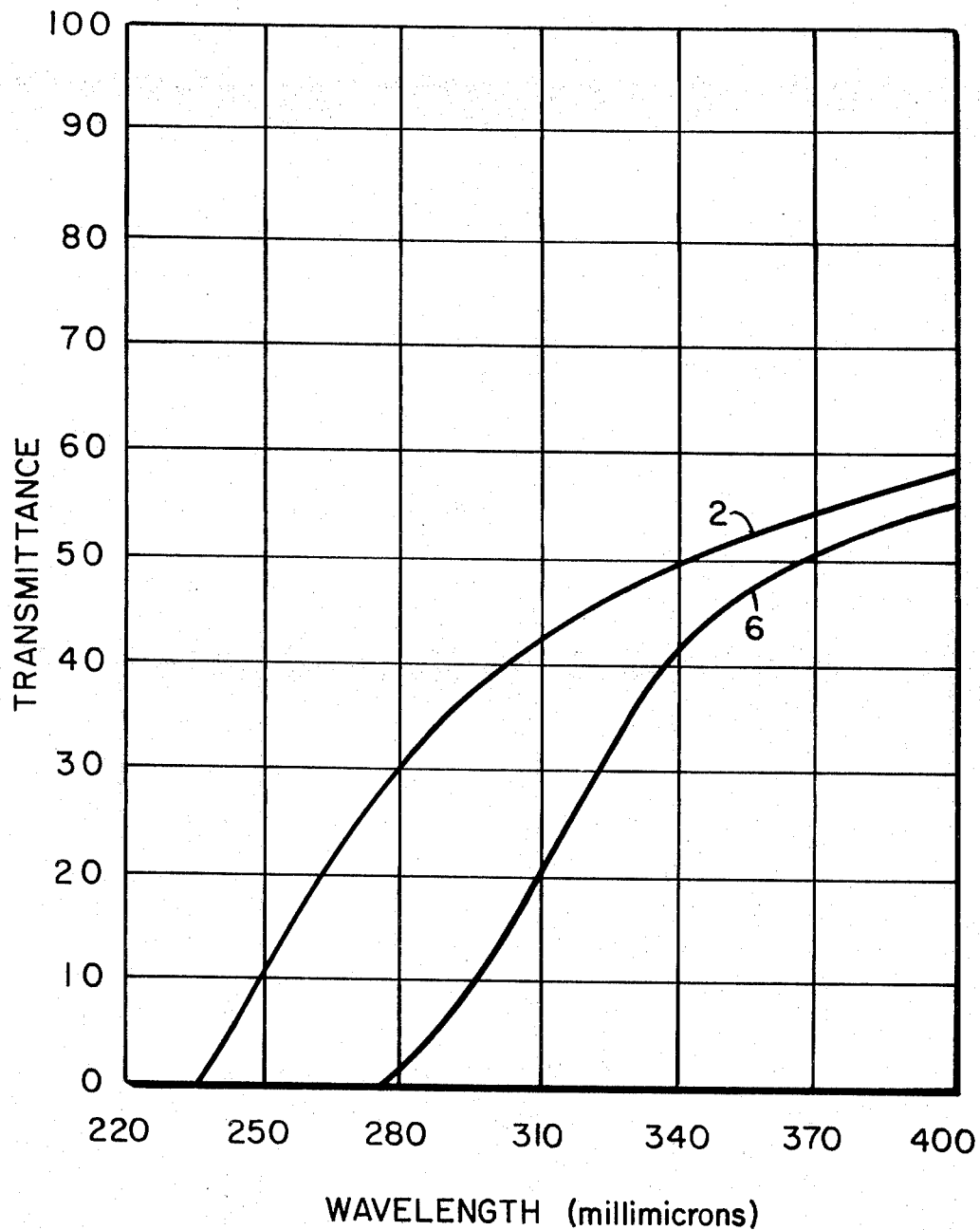

FIG. 3 is a graphical illustration of transmission plotted with respect to wavelength of transmitted radiation corresponding to FIGS. 1 and 2. It shows the transmission curves for the samples prepared from glasses 2 and 6 of Table II, essentially corresponding in composition to glasses A and E of Table I. The curves may, therefore, be compared to curves A and E in FIG. 1. It will be observed that the melted glasses are still somewhat translucent in the visible (400 millimicrons and above) and have broad sloping curves in the ultraviolet.

While the invention has been described with respect to specific glasses and particular applications, it will be evident that numerous variations and modifications are possible within the scope of the invention as defined in the following claims. In particular, the ultraviolet filters of the invention are not limited as to form or shape, or to particular manner of application.

I claim:

1. In a method of controlling transmission of radiation wherein said radiation is passed through a filter that has a sharp transmission cut off within the ultraviolet region of the spectrum and that is substantially non-absorbing in the visible portion therof, the improvement which comprises passing the radiation through a fused silica glass filter prepared by flame hydrolysis the glass composition of which, in percent by weight on an oxide basis, consists of 1–25 percent $R_2O_5$, the $R_2O_5$ consisting of 0–5 percent $Nb_2O_5$ and/or 0–25 percent $Ta_2O_5$, 75–99 percent $SiO_2$, and 0–10 percent $Al_2O_3$ and/or $TiO_2$, whereby said cutoff involves an increase from about 10 to 80 percent transmittance over a wavelength band of not more than 20 millimicrons.

* * * * *